US012280701B2

(12) United States Patent
Harmon

(10) Patent No.: US 12,280,701 B2
(45) Date of Patent: Apr. 22, 2025

(54) DEPLOYABLE FOLDING TRAY SYSTEM FOR A VEHICLE

(71) Applicant: Ford Global Technologies, LLC, Dearborn, MI (US)

(72) Inventor: Michael John Harmon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 18/071,882

(22) Filed: Nov. 30, 2022

(65) Prior Publication Data

US 2024/0174155 A1 May 30, 2024

(51) Int. Cl.
*B60N 3/10* (2006.01)
*B60N 3/00* (2006.01)
*B60R 7/06* (2006.01)
*B60R 11/00* (2006.01)

(52) U.S. Cl.
CPC ............... *B60N 3/002* (2013.01); *B60R 7/06* (2013.01); *B60N 3/102* (2013.01); *B60R 2011/0005* (2013.01)

(58) Field of Classification Search
CPC ........ B60N 3/002; B60N 3/102; B60N 3/004; B60R 7/06; B60R 2011/0005; B64D 11/0638; A47B 3/10
See application file for complete search history.

(56) References Cited

U.S. PATENT DOCUMENTS

| 4,359,004 A * | 11/1982 | Chappell ................. A47C 7/70 297/188.2 |
| 6,109,493 A | 8/2000 | Bieri |
| 7,533,919 B2 | 5/2009 | Sauer |
| 7,926,861 B2 | 4/2011 | Merlo et al. |
| 2012/0006235 A1* | 1/2012 | Rigner .................. B60N 3/002 108/38 |
| 2018/0312094 A1* | 11/2018 | Vuattoux ............... B60N 3/102 |

FOREIGN PATENT DOCUMENTS

| CN | 108814035 A * | 11/2018 | |
| DE | 19854120 A1 | 5/2000 | |
| EP | 1172252 A1 * | 1/2002 | ............. B60N 3/004 |
| EP | 3626528 A1 * | 3/2020 | ............. B60N 3/001 |

* cited by examiner

*Primary Examiner* — Daniel J Colilla
(74) *Attorney, Agent, or Firm* — Vichit Chea; Price Heneveld LLP

(57) ABSTRACT

A deployable folding tray system for a vehicle including a first tray, a second tray pivotally coupled to the first tray, a third tray pivotally coupled to the second tray, and a connector assembly connecting the third tray to a support in a storage compartment which defines a storage space of the vehicle. The second tray pivots relative to the first tray to be deployed from the storage compartment, wherein the first tray pivots relative to the second tray to extend further into a deployed position, and wherein the first, second or third trays are stowed within the storage compartment in a stowed position.

16 Claims, 7 Drawing Sheets

DEPLOYABLE FOLDING TRAY SYSTEM FOR A VEHICLE

FIELD OF THE DISCLOSURE

The present disclosure generally relates to a deployable tray for a vehicle, and more particularly relates to a deployable folding tray that may be deployed from a storage compartment on a vehicle.

BACKGROUND OF THE DISCLOSURE

Motor vehicles are commonly equipped with various storage compartments, such as a glovebox and other storage compartments, and storage consoles that may hold items. The various items may be held and transported in the vehicle utilizing these spaces. It would be desirable to provide for a storage system for holding items with a tray that is stowable and deployable.

SUMMARY OF THE DISCLOSURE

According to a first aspect of the present disclosure, a deployable folding tray system for a vehicle is provided. The deployable folding tray system includes a first tray, a second tray pivotally coupled to the first tray, a third tray pivotally coupled to the second tray, and a connector assembly connecting the third tray to a support in a storage compartment which defines a storage space of the vehicle, wherein the second tray pivots relative to the first tray to be deployed from the storage compartment and wherein the first tray pivots relative to the second tray to extend further into a deployed position, and wherein the first, second or third trays are stowed within the storage compartment in a stowed position.

Embodiments of the first aspect of the present disclosure can include any one or a combination of the following features:

- the third tray further pivots relative to the connector assembly to move between the stowed and deployed positions;
- at least one first hinge connecting the first tray to the second tray and at least one second hinge connecting the second tray to the third tray;
- at least the first tray is configured to rest on a vehicle seat to support at least the first tray;
- a tray connector configured to connect to a seat belt connector associated with the vehicle seat in the deployed position;
- the tray connector comprises a strap and a tongue connector configured to connect to a seat belt buckle;
- a grab handle operatively coupled to the first tray to assist with deployment and stowage of the deployable folding tray system;
- at least one of the first, second and third trays includes one or more item holders having a bottom wall and a side wall;
- the storage compartment comprises a glovebox;
- the first, second and third trays extend between the glovebox and a vehicle seat; and
- a plurality of magnets configured to secure the first, second and third trays in the deployed position.

According to a second aspect of the present disclosure, a vehicle is provided including a seating assembly, a glovebox located forward of the seating assembly and defining a storage space, and a deployable folding tray system configured to be stowed within the glovebox and deployed from the glovebox. The deployable folding tray system includes a first tray, a second tray pivotally coupled to the first tray, a third tray pivotally coupled to the second tray, and a connector assembly connecting the third tray to a support in a storage compartment of the vehicle, wherein the second tray pivots relative to the first tray to be deployed from the storage compartment and wherein the first tray pivots relative to the second tray to extend further into a deployed position supported on or above the seating assembly, and wherein the first, second or third trays are stowed within the storage compartment in a stowed position.

Embodiments of the second aspect of the present disclosure can include any one or a combination of the following features:

- the third tray further pivots relative to the connector assembly to move between the stowed and deployed positions;
- at least one first hinge connecting the first tray to the second tray and at least one second hinge connecting the second tray to the third tray;
- the at least first tray is configured to rest on a vehicle seat of the seating assembly to support at least the first tray in the deployed position;
- a tray connector configured to connect to a seat belt connector associated with the seating assembly;
- the tray connector comprises a strap and a tongue connector configured to connect to a seat belt buckle;
- a grab handle operatively coupled to the first tray to assist with deployment and stowage of the deployable folding tray system;
- the glovebox is located in a dashboard and has a door movable between open and closed positions; and
- at least one of the first, second and third trays includes one or more item holders having a bottom wall and a side wall.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
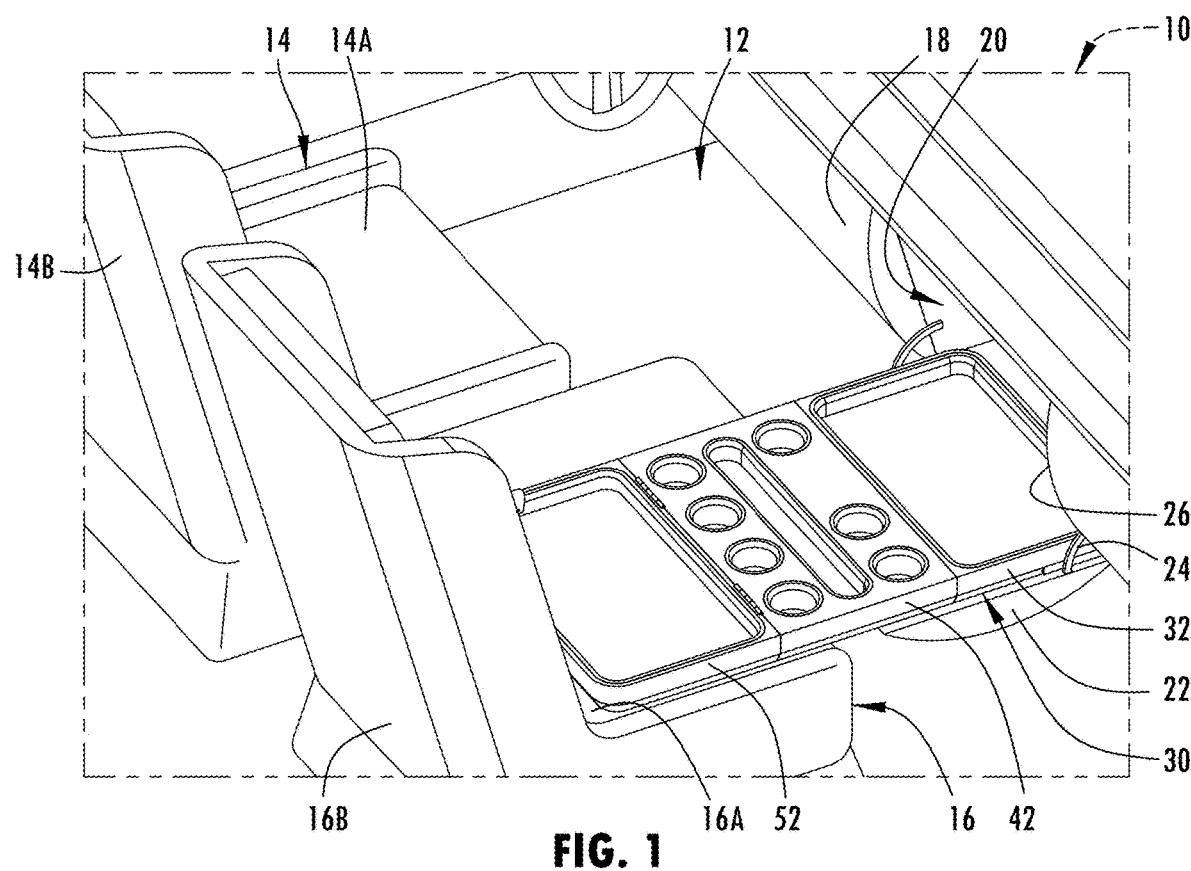
FIG. 1 is an upper side perspective view of a cabin interior of a motor vehicle equipped with a deployable folding tray system shown fully deployed from the glovebox, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and a deployable folding tray system for the vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle is generally illustrated configured with passenger seating for transporting one or more passengers including a driver and front passenger of the vehicle 10 and for further transporting one or more items onboard the vehicle 10. The motor vehicle 10 has a vehicle body that generally defines a cabin interior 12. The cabin interior 12 may contain various features and trim components. The cabin interior 12 is shown having an arrangement of passenger seats including a first seat assembly 14 configured to seat a driver and a second seat assembly 16 configured to seat a passenger. The first and second seat assemblies 14 and 16 may be configured as captain seats separated by a center console, for example, or bench seats. The vehicle 10 may also include additional seating such as second, third and more rows of seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers and items.

The motor vehicle 10 is illustrated having the first seat assembly 14 positioned vehicle rearward of a steering wheel configured for seating a driver of the vehicle 10. The first seat assembly 14 includes a seat base 14A and a seat back 14B. The second seat assembly 16 is shown positioned vehicle rearward of a glovebox 20 and has a seat base 16A and a seat back 16B configured for seating a passenger. The glovebox 20 is a storage compartment defining a storage space 26 that may be used to store a deployable folding tray system 30 and various items. The glovebox 20 is generally formed in a dashboard 18 forward of the second seat assembly 16. The glovebox 20 further includes a door 22 that may pivot on hinges 24, such as gooseneck hinges, between a closed position in which the glovebox 20 is closed and an open position in which the glovebox is exposed and accessible.

Figure 1A:
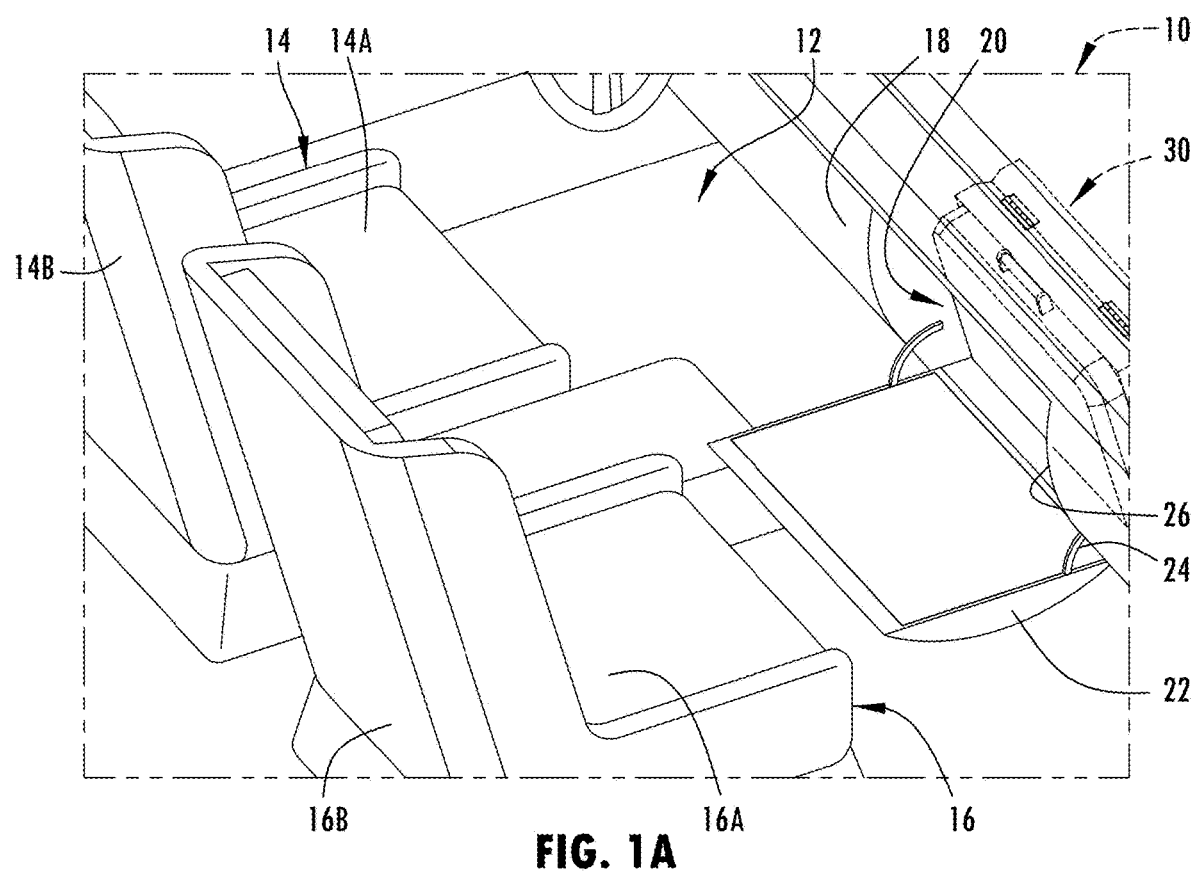
FIG. 1A is an upper side perspective view of the cabin interior showing the deployable folding tray system stowed within the glovebox.

The vehicle 10 is equipped with the deployable folding tray system 30 which is shown in an unfolded deployed use position in FIG. 1 and is further illustrated in a folded stowed position stowed within the storage space 26 of the glovebox 20 as seen in FIG. 1A. As such, the deployable folding tray system 30 may be folded, such as tri-folded, and stowed within the storage space 26 of the glovebox 20 when not in use. The deployable folding tray system 30 may be unfolded and deployed from the stowed position to the fully deployed position as seen in FIG. 1 to provide a fully deployed tray configured to hold one or more items in a steady and supported arrangement in the vehicle 10. As such, the deployable folding tray system 30 provides a storage tray configured to hold and transport items in the vehicle 10.

The deployable folding tray system 30 includes a first tray 52 which, in the deployed position, provides the outermost tray portion of the fully deployed tray. The deployable folding tray system 30 further includes a second tray 42 which, in the deployed position, provides an intermediate portion of the fully deployed tray. The second tray is pivotally coupled to the first tray via at least one hinge. In the example shown in FIG. 6, a pair of piano hinges 54 with hinge pins 56 interconnect the first tray 52 to the second tray 42 and allow the first tray 52 to pivot and fold relative to the second tray 42 such that the first tray 52 may fold 180° against the second tray 42 or extend co-planar. The deployable folding tray system 30 further includes a third tray 32 pivotally coupled to the second tray 42. The third tray 32, in the deployed position, provides the innermost portion of the fully deployed tray. The third tray 32 is pivotally coupled to the second tray 42 via at least one hinge. In the example shown, a pair of piano hinges 44 with hinge pins 46 interconnect the third tray 32 with the second tray 42 and allow the second tray 42 to pivot up and fold 180° against the third tray 32 or extend co-planar.

A connector assembly 34 connects the innermost third tray 32 to a support member in the glovebox 20. The connector assembly 34 has a pair of elongated arms each having a pivot hole 38 at one end, connected to an anchor point in the glovebox 20 via pivot pins 36. As such, the third tray 32 may pivot about pivot pins 36 to move between the unfolded deployed and the folded stowed positions.

Figure 2A:
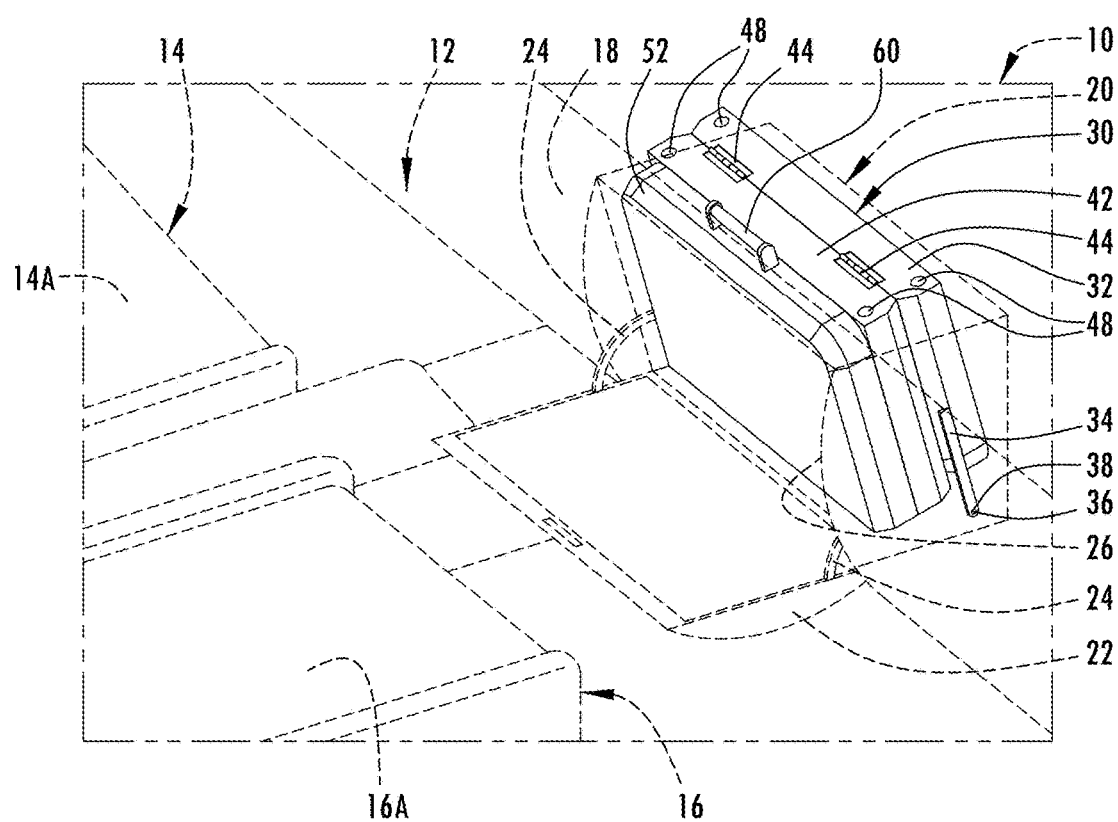
FIG. 2A is an enlarged perspective view of the deployable folding tray system in the stowed position within the glovebox.
Figure 2B:
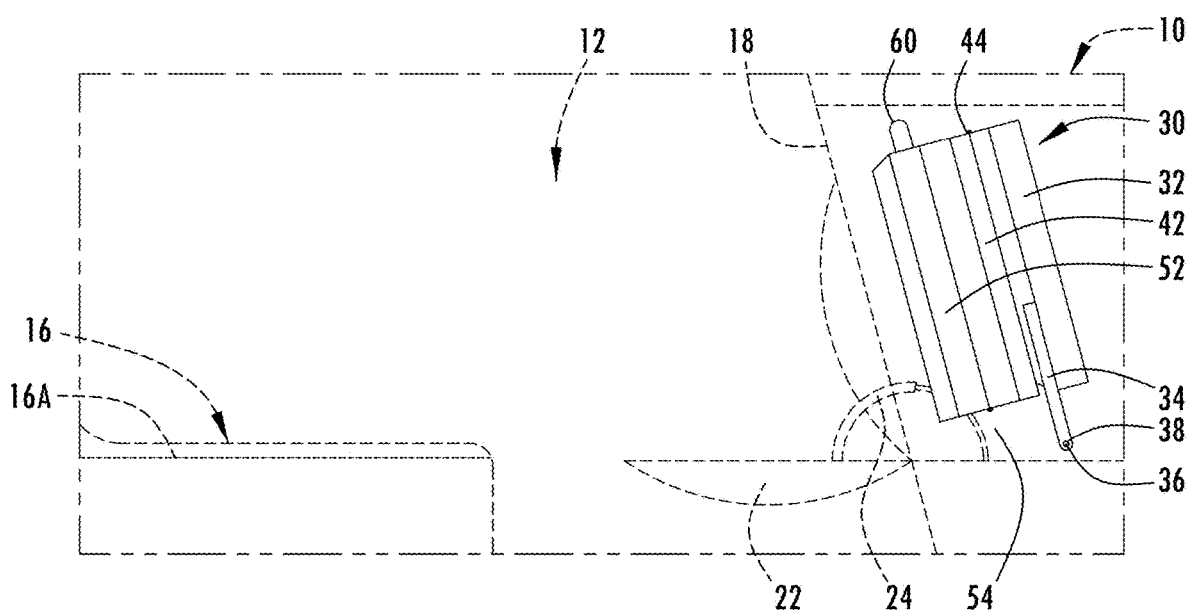
FIG. 2B is a side schematic view of the deployable folding tray system shown in the stowed position within the glovebox as seen in FIG. 2A.
Figure 3A:
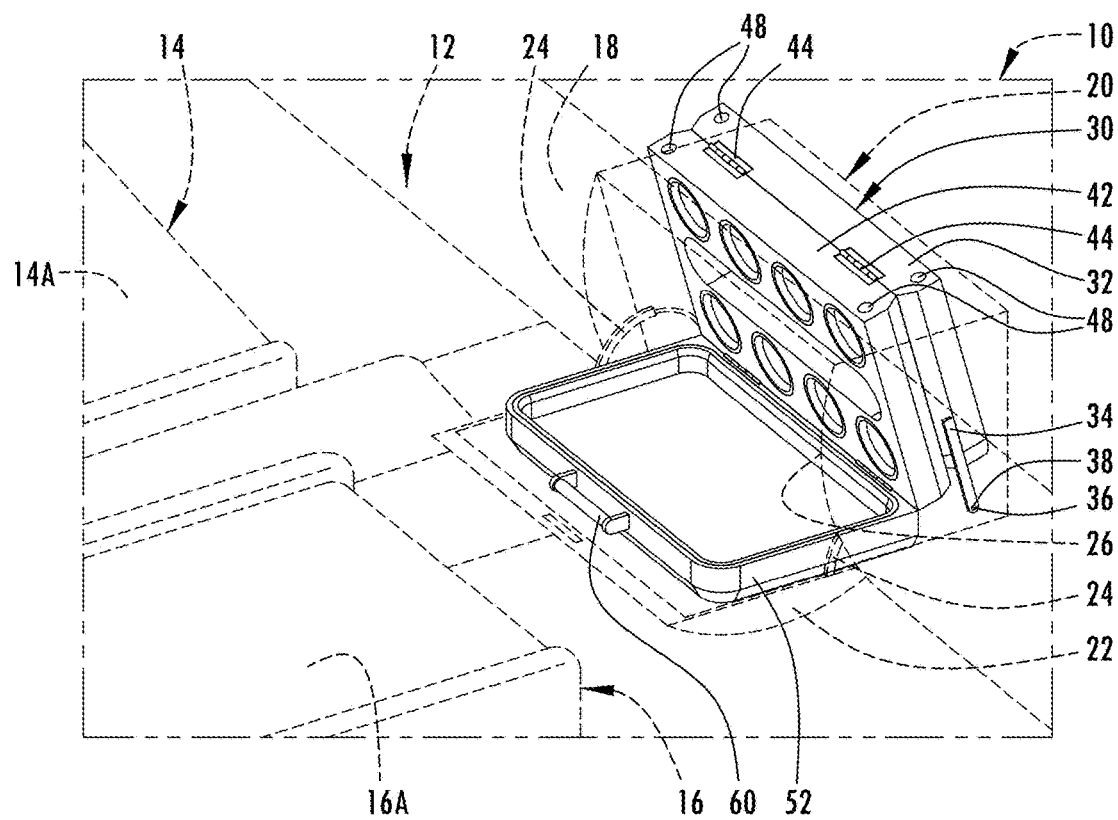
FIG. 3A is an upper side perspective view of the deployable folding tray system partially deployed from the glovebox.
Figure 3B:
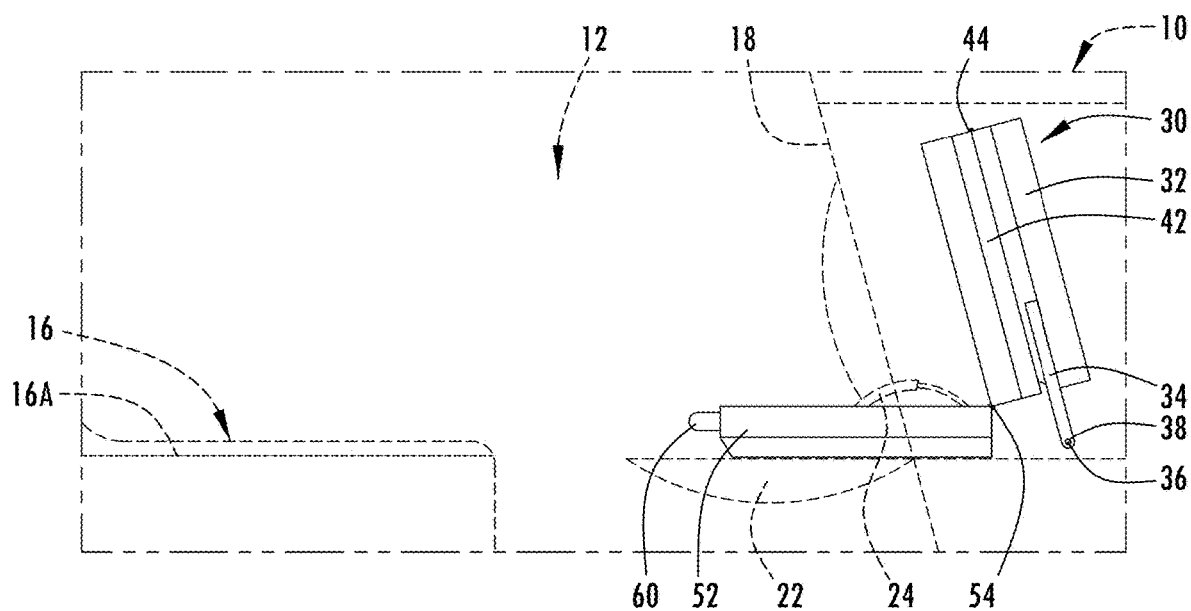
FIG. 3B is a side view of the deployable folding tray system shown in the partially deployed position as seen in FIG. 3A.
Figure 4A:
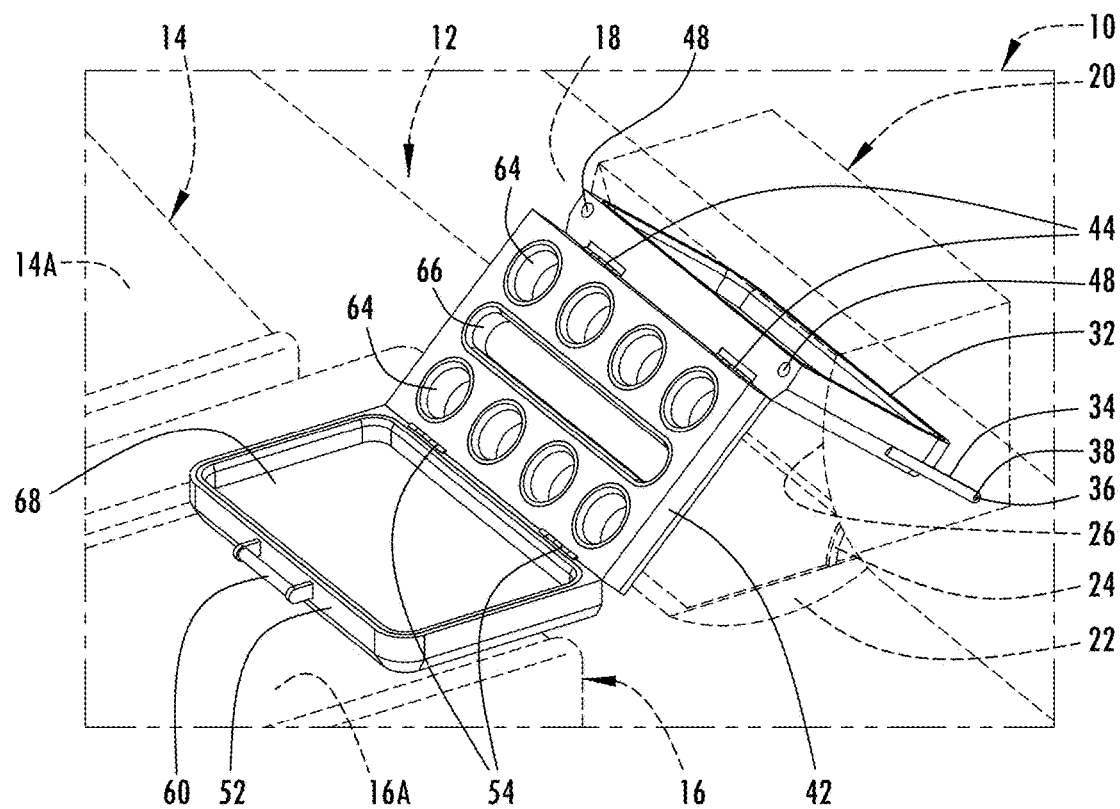
FIG. 4A is an upper side perspective view of the deployable folding tray system shown in a further deployed position extending from the glovebox.
Figure 4B:
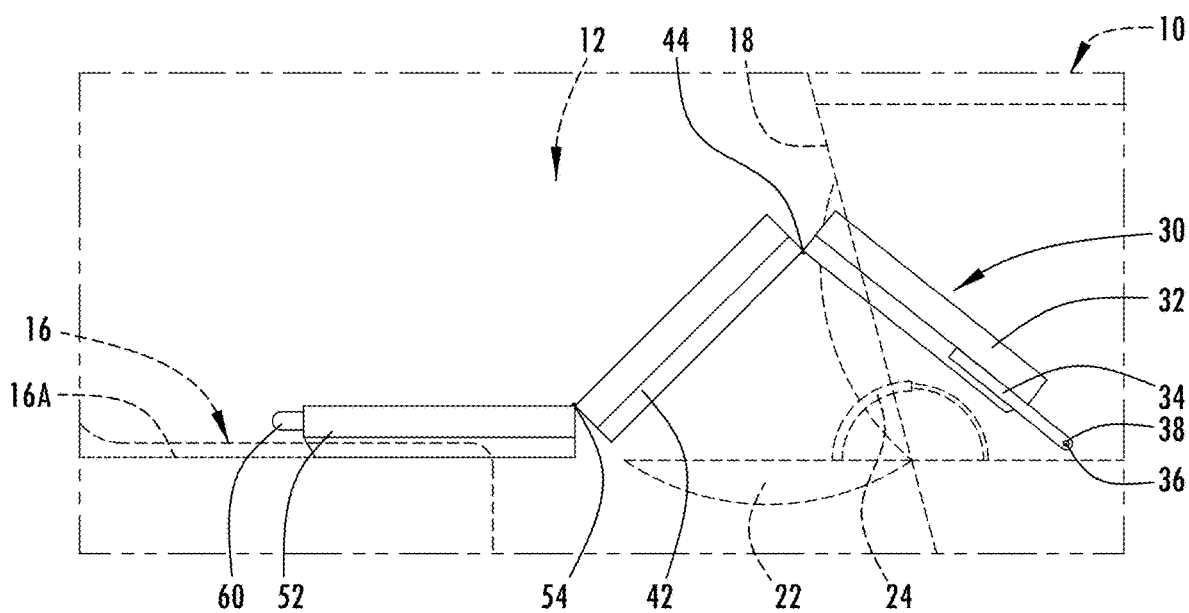
FIG. 4B is a side view of the deployable folding tray system shown in the further deployed position as seen in FIG. 4A.
Figure 5A:
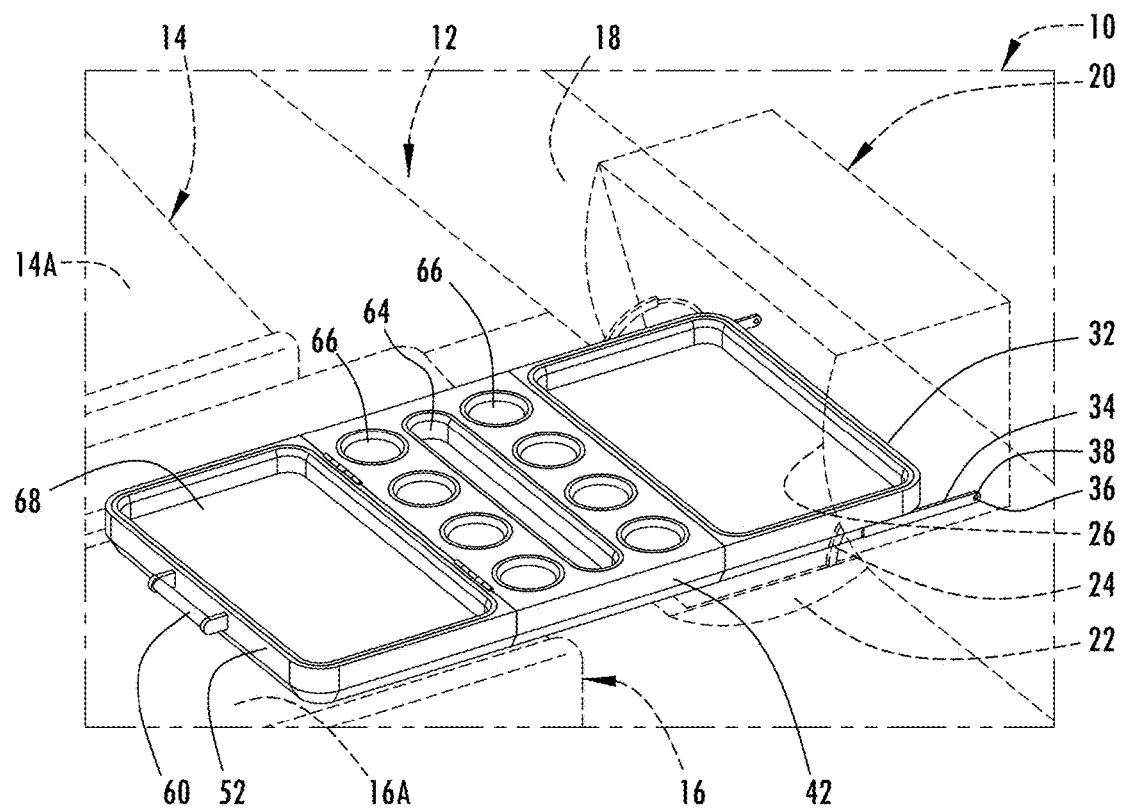
FIG. 5A is an upper side perspective view of the deployable folding tray system shown in a fully deployed position.
Figure 5B:
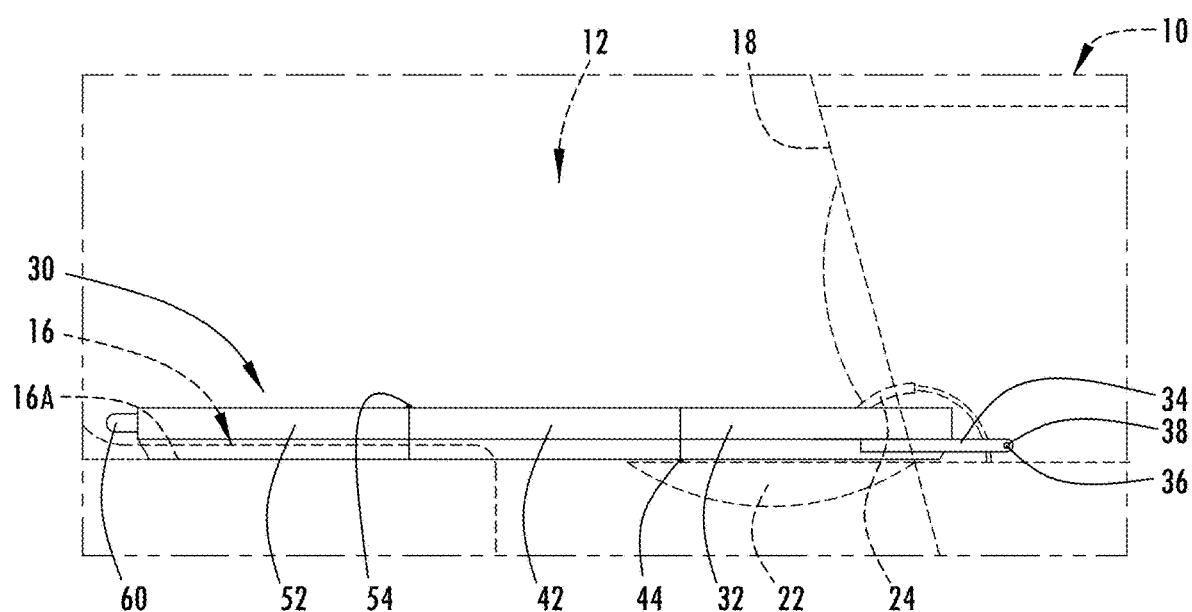
FIG. 5B is a side view of the deployable folding tray system shown in the fully deployed position as seen in FIG. 5A.

Referring to FIGS. 2A and 2B, the deployable folding tray system 30 is shown fully stowed within the storage space 26 of the glovebox 20. In this position, the first, second and third trays 52, 42 and 32 are folded upon each other into a compact folded position and tilted vertically downward at an angle within the storage space 26. The glovebox door 22 may be closed to conceal the stowed deployable folding tray system 30. The deployable tray system 30 may be deployed to the use position by first opening the door 22 of the glovebox 20 to the open position as shown in FIGS. 2A and 2B. Next, the first tray 52 may be pivoted forward and unfolded relative to the second tray 42 to a partially deployed position shown in FIGS. 3A and 3B. In this partially deployed position, the first tray 52 is shown resting on the glovebox cover 22. Next, the second tray 42 may be pivoted and unfolded relative to the third tray 32 to a further deployed position as shown in FIGS. 4A and 4B. In this further deployed position, the first tray 52 is further extended outwards and vehicle rearwards towards the vehicle seat assembly 16 and may rest on top of the seat base 16A. To fully deploy the deployable folding tray system 30, the first tray 52 is further extended vehicle rearward such that the third tray 32 pivots about pivot pins 36 to a substantially horizontal and fully deployed position as shown in FIGS. 5A and 5B. In this position, each of the first tray 52, second tray 42, and third tray 32 are substantially co-planar and horizontal, with at least the third tray 32 supported on the seat base 16A. It should be appreciated that the folding tray system 30 is intended to be deployed at an unoccupied seating position.

In the fully deployed position, the first tray 52 is shown having a substantially rectangular shaped tray surface on top for holding one or more items. The second or intermediate tray 42 is shown having a plurality of shaped surface contours configured to hold items. For example, the contoured shaped portions may include a plurality of cupholders 66 configured to receive a plurality of cups. Additionally, an elongated shaped tray 64 is formed in the middle to receive items that may be elongated, for example. The third tray 32 has a substantially rectangular shaped tray for holding one or more items. As such, each of the trays include surfaces are designed to hold items such that the items may be held in the vehicle and transported when desired. In the example shown, the deployable folding tray system 30 may be configured to hold items for delivery such as food or drink containers for food delivery. However, it should be appreciated that any of a number of items may be held and transported on the deployable folding tray system 30. It should further be appreciated that securing straps or other securing mechanisms may be employed to secure items on each of the first, second and third trays 52, 42 and 32. For example, one or more elastic and/or ratcheting straps may extend over the shaped surface contours.

Figure 6:
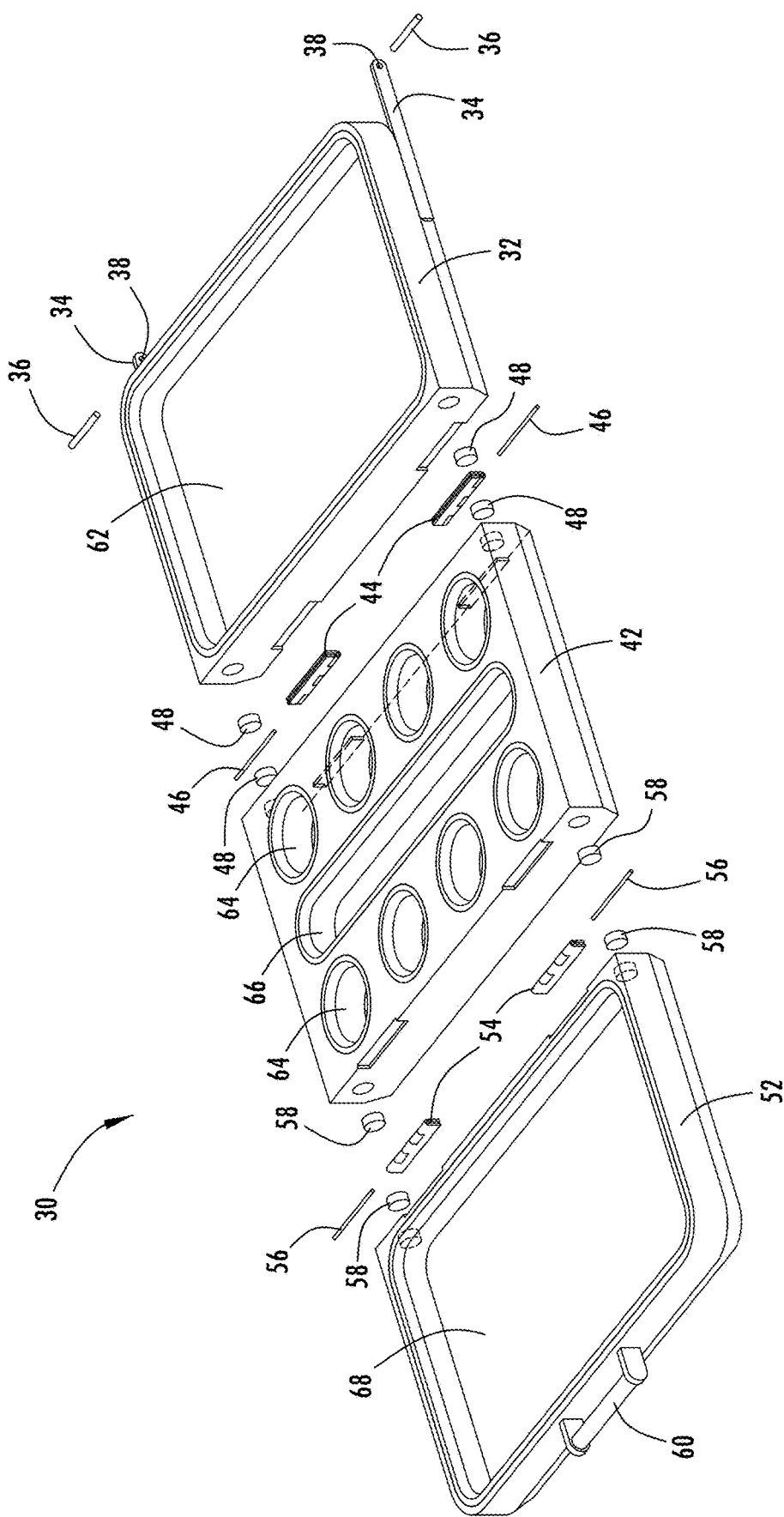
FIG. 6 is an exploded view of the deployable folding tray system.

As seen in FIG. 6, the deployable folding tray system 30 may include an assist handle 60. The assist handle 60 is shown located at the outermost end of the first tray 52 to enable a user to grip the assist handle 60 to pull on the assist handle 60 to unfold and deploy the deployable folding tray system 30 and to push on the assist handle 60 to fold and stow the deployable folding tray system 30 within the glovebox 20.

The deployable folding tray system 30 further has two pairs of magnets 58 and 48 located between adjacent walls of the first and second trays 52 and 42 and between adjacent walls of the second and third trays 42 and 32. The pairs of magnets 58 and 48 advantageously assist with securing the tray system 30 in the fully deployed position and may reduce vibration of the tray portions when fully deployed. Additionally or alternatively, clip detents may be used to secure the trays in the deployed position.

Figure 7:
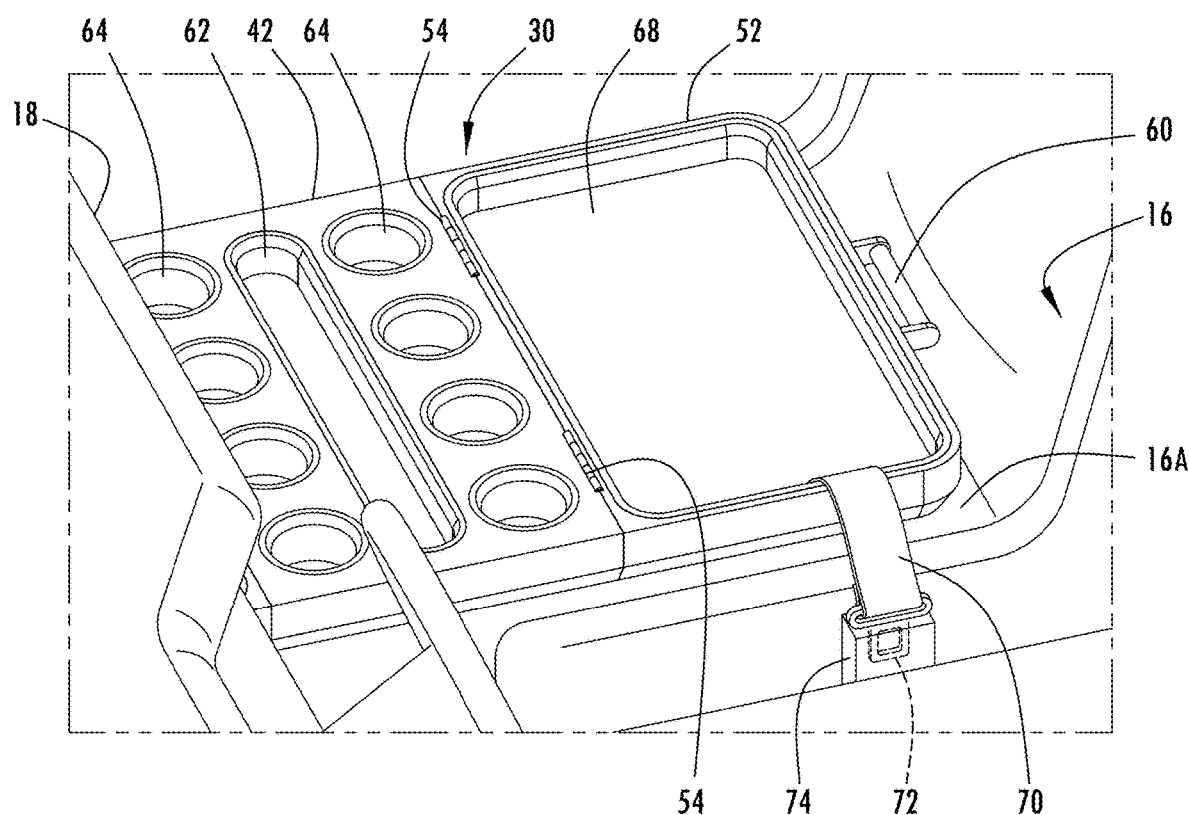
FIG. 7 is an upper side view of the deployable folding tray system shown resting on a seat and connected to a seat buckle.

Referring to FIG. 7, the deployable folding tray system 30 is further illustrated in the fully deployed position with at least the first tray 52 resting on the seat base 16A. The first tray 52 is further shown having a seat belt connector 70 include a strap and seat belt tongue 72 that is configured to connect into a seat belt buckle connector 74 on the seat assembly. As such, the seat belt connector 70 enables the first tray 52 and hence the deployable folding tray system 30 to be restrained onto the seat base 16A to prevent movement of the deployable folding tray system 30 relative to the seat assembly 16.

Accordingly, the deployable folding tray system 30 advantageously provides for a stowable and deployable tray within the vehicle 10 to hold and assist with containment and transportation of one or more items. The tray system 30 may be fully stowed within a glovebox 20 or other storage compartment when not in use and may fully deployed from the glovebox 20 to provide an increased availability of item holders for transportation or for use on the vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A deployable folding tray system for a vehicle, the deployable folding tray system comprising:
   a first tray;
   a second tray pivotally coupled to the first tray;
   a third tray pivotally coupled to the second tray;
   a connector assembly connecting the third tray to a support in a storage compartment which defines a storage space of the vehicle, wherein the second tray pivots relative to the first tray to be deployed from the storage compartment and wherein the first tray pivots relative to the second tray to extend further into a deployed position, wherein at least the first tray is configured to rest on a vehicle seat to support at least the first tray in the deployed position, and wherein the first, second and third trays are stowed within the storage compartment in a stowed position; and
   a tray connector configured to connect to a seat belt connector associated with the vehicle seat in the deployed position.

2. The deployable folding tray system of claim 1, wherein the third tray further pivots relative to the connector assembly to move between the stowed and deployed positions.

3. The deployable folding tray system of claim 1 further comprising at least one first hinge connecting the first tray to the second tray and at least one second hinge connecting the second tray to the third tray.

4. The deployable folding tray system of claim 1, wherein the tray connector comprises a strap and a tongue connector configured to connect to the seat belt connector.

5. The deployable folding tray system of claim 1 further comprising a grab handle operatively coupled to the first tray to assist with deployment and stowage of the deployable folding tray system.

6. The deployable tray system of claim 1, wherein at least one of the first, second and third trays includes one or more item holders having a bottom wall and a side wall.

7. The deployable tray system of claim 1, wherein the storage compartment comprises a glovebox.

8. The deployable tray system of claim 7, wherein the first, second and third trays extend between the glovebox and a vehicle seat.

9. The deployable tray system of claim 1 further comprising a plurality of magnets configured to secure the first, second and third trays in the deployed position.

10. A vehicle comprising:
    a seating assembly;
    a glovebox located forward of the seating assembly and defining a storage space;
    a deployable folding tray system configured to be stowed within the glovebox and deployed from the glovebox, the deployable folding tray system comprising:
    a first tray;
    a second tray pivotally coupled to the first tray;
    a third tray pivotally coupled to the second tray;
    a connector assembly connecting the third tray to a support in a storage compartment of the vehicle, wherein the second tray pivots relative to the first tray to be deployed from the storage compartment and wherein the first tray pivots relative to the second tray to extend further into a deployed position, supported on or above the seating assembly, wherein at least the first tray is configured to rest on a vehicle seat to support at least the first tray in the deployed position, and wherein the first, second and third trays are stowed within the storage compartment in a stowed position; and
    a tray connector configured to connect to a seat belt connector associated with the seating assembly.

11. The vehicle of claim 10, wherein the third tray further pivots relative to the connector assembly to move between the stowed and deployed positions.

12. The vehicle of claim 10 further comprising at least one first hinge connecting the first tray to the second tray and at least one second hinge connecting the second tray to the third tray.

13. The vehicle of claim 10, wherein the tray connector comprises a strap and a tongue connector configured to connect to the seat belt buckle of the seat belt connector.

14. The vehicle of claim 10 further comprising a grab handle operatively coupled to the first tray to assist with deployment and stowage of the deployable folding tray system.

15. The vehicle of claim 10, wherein the glovebox is located in a dashboard and has a door movable between open and closed positions.

16. The vehicle of claim 10, wherein at least one of the first, second and third trays includes one or more item holders having a bottom wall and a side wall.

* * * * *